United States Patent
Mulcahy et al.

(10) Patent No.: US 8,250,353 B2
(45) Date of Patent: Aug. 21, 2012

(54) FIRMWARE EXCLUSIVE ACCESS OF A PERIPHERAL STORAGE DEVICE

(75) Inventors: Luke M. Mulcahy, Houston, TX (US); Christoph J. Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1142 days.

(21) Appl. No.: 11/998,281

(22) Filed: Nov. 29, 2007

(65) Prior Publication Data

US 2009/0144533 A1 Jun. 4, 2009

(51) Int. Cl.
- G06F 9/00 (2006.01)
- G06F 9/24 (2006.01)
- G06F 15/177 (2006.01)
- G06F 17/30 (2006.01)

(52) U.S. Cl. ............. 713/2; 713/1; 713/100; 726/2
(58) Field of Classification Search ........... 713/1, 2, 713/100; 726/2
See application file for complete search history.

(56) References Cited

U.S. PATENT DOCUMENTS

| | | | |
|---|---|---|---|
| 6,463,550 B1* | 10/2002 | Cepulis et al. | 714/25 |
| 6,823,464 B2* | 11/2004 | Cromer et al. | 726/5 |
| 7,496,765 B2* | 2/2009 | Sengoku | 713/189 |
| 7,549,161 B2* | 6/2009 | Poo et al. | 726/5 |
| 2002/0010891 A1* | 1/2002 | Klein | 714/767 |
| 2006/0004974 A1* | 1/2006 | Lin et al. | 711/164 |
| 2008/0250165 A1* | 10/2008 | Reynolds et al. | 710/17 |
| 2008/0270652 A1* | 10/2008 | Jeansonne | 710/108 |
| 2009/0049307 A1* | 2/2009 | Lin | 713/185 |
| 2009/0327755 A1* | 12/2009 | Ikeda et al. | 713/189 |

* cited by examiner

*Primary Examiner* — Ji H Bae

(57) ABSTRACT

A method includes searching a peripheral storage device for a key during a firmware boot process of a computer system. Operating system access to the peripheral storage device is disabled if the key exists. Another method includes disabling operating system access to a peripheral storage device coupled to a pre-determined attachment point of a computer system during a firmware boot process of the computer system.

15 Claims, 9 Drawing Sheets

DURING A FIRMWARE BOOT, DISABLE OPERATING SYSTEM ACCESS TO A PERIPHERAL STORAGE DEVICE ASSOCIATED WITH A PRE-DETERMINED ATTACHMENT POINT ~710

FIG. 7

FIRMWARE EXCLUSIVE ACCESS OF A PERIPHERAL STORAGE DEVICE

BACKGROUND

Computer systems include firmware to provide an interface between the operating system and hardware such as peripheral devices. The firmware for some computer systems includes a Basic Input/Output System (BIOS).

During the boot process, the processor executes BIOS code to enumerate or identify devices including peripheral devices of the computer system. The BIOS includes tables identifying the devices and how to communicate with them. The firmware is stored in a nonvolatile memory.

As computer systems have grown in sophistication so has the need for secure storage. A peripheral storage device such as a hard drive may be used to supplement the BIOS. One approach for secure storage establishes a hard drive partition for handling secure storage. The hard drive, however, is typically also exposed to the operating system and application code external to the BIOS.

If the partition is accessible from program code other than the BIOS program code, the partition is subject to tampering or data corruption. Concealing the partition or locking the partition to prevent changes by non-BIOS program code requires co-operation from applications external to the BIOS and is thus inherently insecure. The partition contents may be lost, for example, by reformatting or re-partitioning the hard drive.

SUMMARY

One method of providing computer system firmware with exclusive access to a peripheral storage device includes searching the peripheral storage device for a key during a firmware boot process. Operating system access to the peripheral storage device is disabled, if the key exists.

Another embodiment of a method includes searching the peripheral storage device for a key during a firmware boot process. If the key is found, information corresponding to instructions or data is retrieved from the peripheral storage device. The information is processed. Operating system access to the peripheral storage device is disabled.

Another embodiment of a method includes enabling access to a peripheral storage device in response to operating system suspension. The peripheral storage device is searched for a key. If the key exists, information corresponding to instructions or data is retrieved from the peripheral storage device. The information is processed. Operating system access to the peripheral storage device is disabled.

Another embodiment of a method includes disabling operating system access to a peripheral storage device coupled to a pre-determined attachment point of a computer system during a firmware boot process of the computer system.

Another embodiment of a method includes retrieving information corresponding to instructions or data from a peripheral storage device associated with a pre-determined attachment point during a firmware boot process. The information is processed. Operating system access to the peripheral storage device is disabled.

Another embodiment of a method includes enabling access to a peripheral storage device associated with a pre-determined attachment point in response to operating system suspension. Information corresponding to instructions or data is retrieved from the peripheral storage device. The information is processed. Operating system access to the peripheral storage device is disabled.

BRIEF DESCRIPTION OF THE DRAWINGS

Embodiments of the present invention are illustrated by way of example and not limitation in the figures of the accompanying drawings, in which like references indicate similar elements and in which:

FIG. 7 illustrates one embodiment of disabling operating system access to a device based upon the location of the device within the computer system.

DETAILED DESCRIPTION

Figure 1:
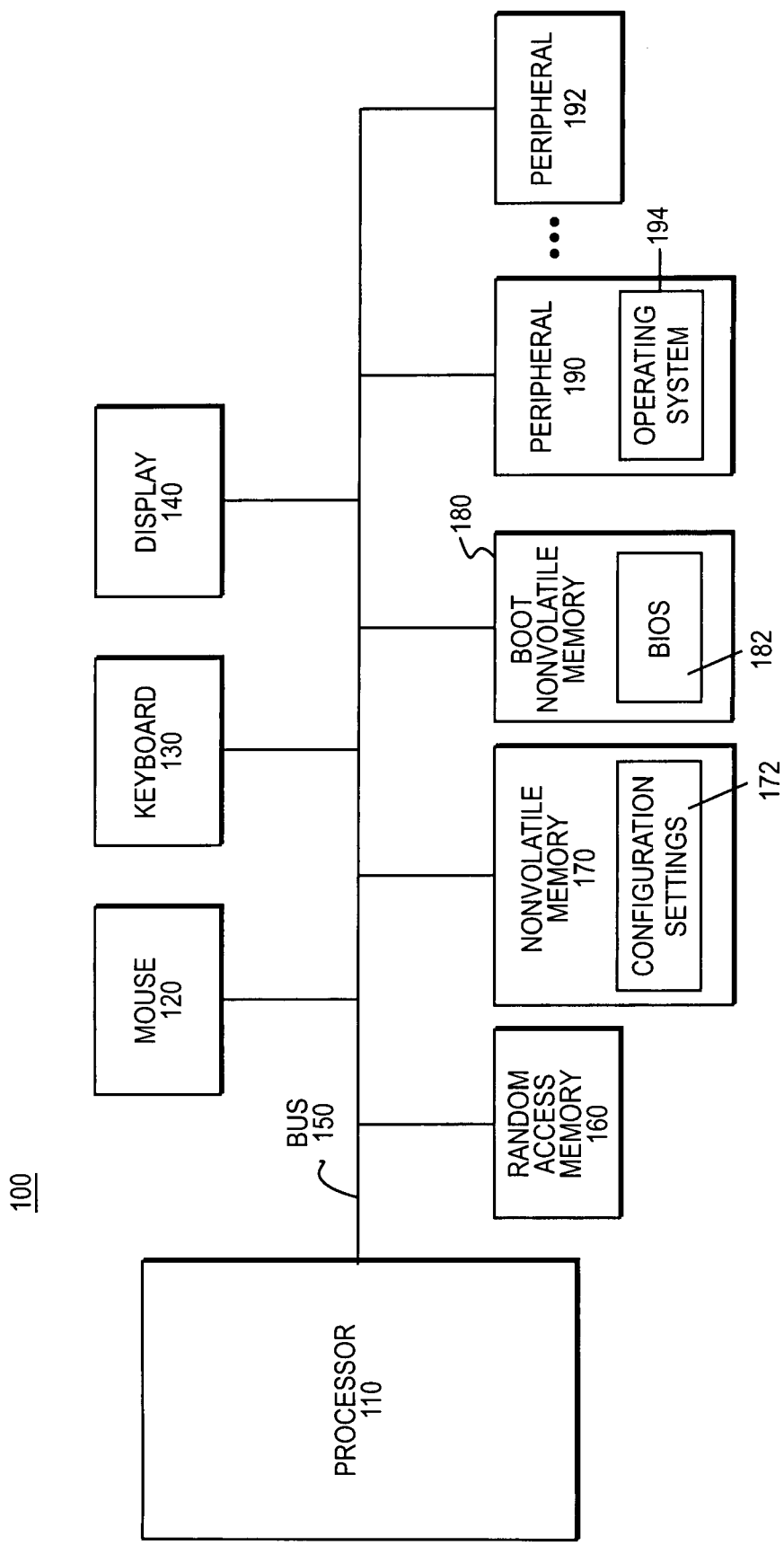
FIG. 1 illustrates one embodiment of a computer system.

FIG. 1 illustrates one embodiment of a computer system architecture. Computer 100 includes processor 110. Input devices such as mouse 120 and keyboard 130 permit the user to input data to client computer 100. Information generated by the processor is provided to an output device such as display 140. Computer 100 includes random access memory (RAM) 160 used by the processor during program execution.

RAM 160 is typically a volatile memory and does not retain its contents once power is removed from the computer system. Computer 100 includes nonvolatile memory 170 for storing configuration settings 172 even when the computer is powered down. Often parameter information that identifies specific features of the input/output devices is stored in nonvolatile memory 170. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 170 is a semiconductor-based memory. Various types of nonvolatile media including electrically erasable programmable read only memory (EEPROM), flash electrically re-writable memory, and battery-backed complementary metal oxide semiconductor (CMOS) are available.

The computer also has one or more peripherals 190, 192 such as a floppy drive, a hard drive, or an optical drive that supports nonvolatile storage. Compact disks (CDs) and Digital Video Disks (DVDs) are examples of media used with optical drives.

Mouse 120, keyboard 130, display 140, RAM 160, nonvolatile memory 170, and boot nonvolatile memory 180 are communicatively coupled to processor 110 through one or more buses such as bus 150.

Figure 2:
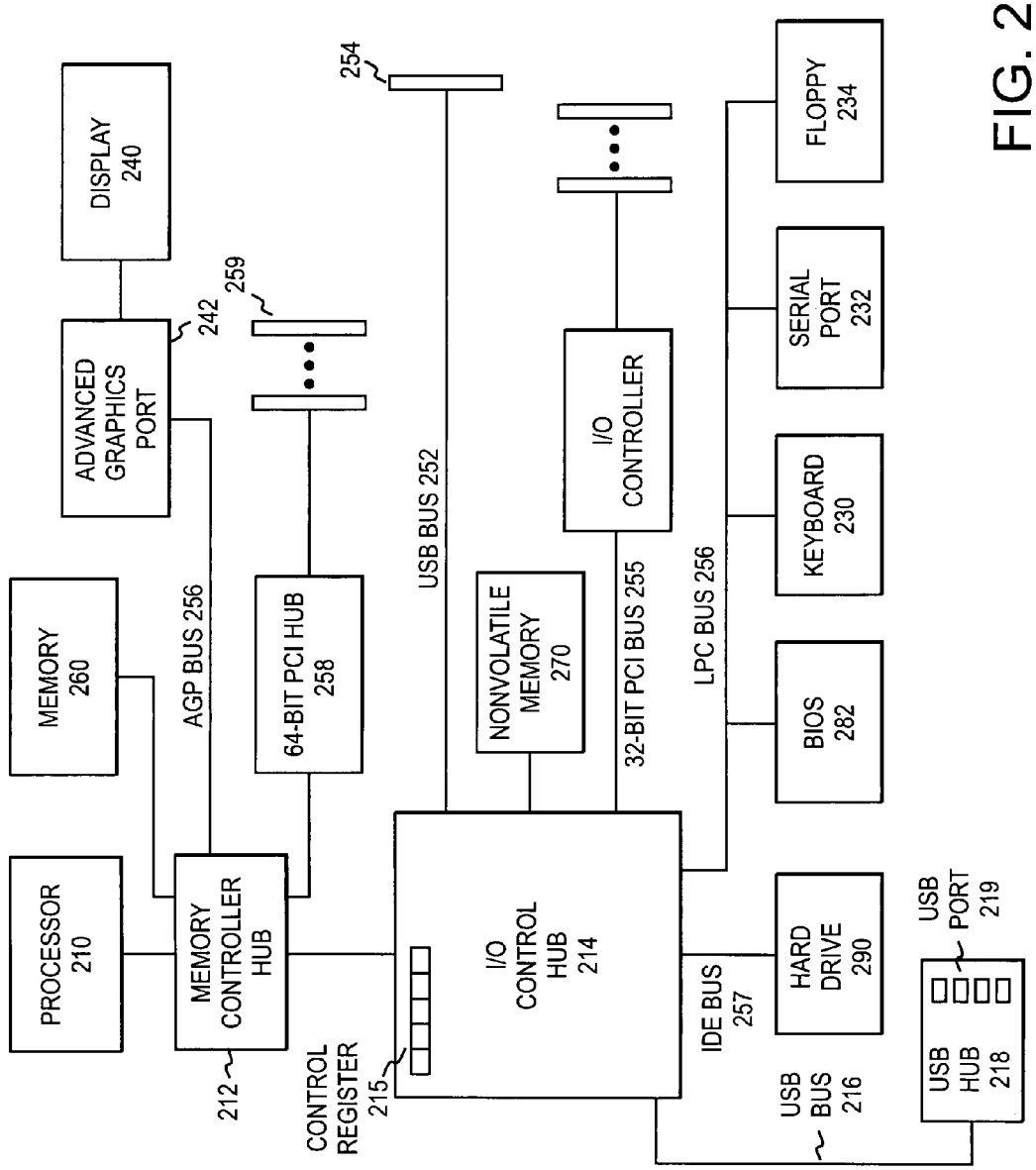
FIG. 2 illustrates another embodiment of a computer system.

There are many possible variations for the number and type of busses and peripheral devices. FIG. 2 illustrates another embodiment of a computer system and its components. This is one embodiment of a "north bridge", "south bridge" configuration. The north bridge is typically associated with integrated circuitry handling high-speed memory operations such as between the processor, system memory, and display system. The south bridge is associated with integrated circuitry handling lower speed peripheral devices including hard drives, optical disk drives, floppy disk drives, as well as devices coupled to busses such as Universal Serial Bus and Peripheral Component Interconnect busses, for example.

The north bridge is the memory controller hub (MCH) 212. The MCH provides a host interface to processor 210. The MCH also supports the memory 260 and the display interface. Common display interfaces include the PCI-Express interface and Advanced Graphics Port interface. In the illustrated embodiment, the MCH supports an Advanced Graphic Port (AGP) interface 240 via an AGP bus 256. The AGP interface is one embodiment of a display interface. An AGP video controller is plugged into the AGP interface for driving the display 240. The north bridge is sometimes referred to as a Graphics and Memory Control Hub when the video or display controller is integrated into the north bridge. In various embodiments, other high speed peripheral devices may be coupled more directly to the north bridge rather than the south bridge. For example, a 64-bit Peripheral Component Interconnect hub 258 (i.e., PCI-Express) is provided to support other peripheral devices that may be attached at attachment points 259. The MCH handles communications between the memory, processor, display interface, and the south bridge.

The south bridge is the I/O Controller Hub (ICH) 214. The south bridge or ICH supports I/O through various busses. Nonvolatile memory 270 is typically a battery-backed CMOS memory. The BIOS nonvolatile memory 282, keyboard 230, serial port 232, and floppy drive 234 are coupled to the ICH via a Low Pin Count (LPC) bus 256. A hard drive 290 is coupled to the ICH via an Integrated Device Electronics (IDE) bus 257. A 32-bit PCI bus 255 supports expansion of functionality. PCI bus controller cards may be coupled to the PCI bus to support additional peripheral devices. The ICH may also directly support a plurality of Universal Serial Bus (USB) ports. USB devices may be coupled to the ICH at an attachment point 253. The attachment point is communicatively coupled to the ICH via a USB bus 252.

Initialization of the computer system is performed upon power-up of the computer system or hardware or software reset operations. In one approach, the processor is designed to read a pre-determined memory location when the processor is reset or powered up. The pre-determined memory location stores a pointer or an address that directs the processor to the beginning of the bootstrap routines. The pointer or address is referred to as a boot vector. For some types of resets (e.g., a "hard" or "cold" reset), the boot vector is always set to a value determined at the time of manufacture of the processor. Other types of resets (e.g., "soft" or "warm" reset) permit an alternative boot vector to be used.

For hard resets, the boot vector typically points to an address in the boot nonvolatile memory 180. For soft resets, however, the boot vector may point to a RAM location. The boot nonvolatile memory stores the bootstrap loader and typically stores other initialization routines such as power on system test (POST). Although occasionally referred to as a boot read only memory (ROM), the boot nonvolatile memory is typically embodied at least partially as a re-writable nonvolatile memory to permit updates. For example, in one embodiment the boot nonvolatile memory comprises a semiconductor flash electrically re-writable memory.

The boot nonvolatile memory may include routines for communicating with input/output devices in the computer system. In some computer systems these routines are collectively referred to as the Basic Input Output System (BIOS) 182. The BIOS provides a common interface so that software executing on the processor can communicate with input/output devices such as the keyboard, mouse, nonvolatile mass memory storage device, and other peripheral devices.

The BIOS is the interface between the operating system and the hardware of the computer system. The BIOS includes drivers to enable communication with many types of devices such that functional access may be achieved prior to loading the operating system. For example, the BIOS includes drivers to permit accessing the hard drive 290. The BIOS includes drivers for accessing USB peripheral storage devices such as USB floppy drives, USB hard drives, and USB nonvolatile storage such as a USB-compatible flash memory peripheral device.

Figure 3:
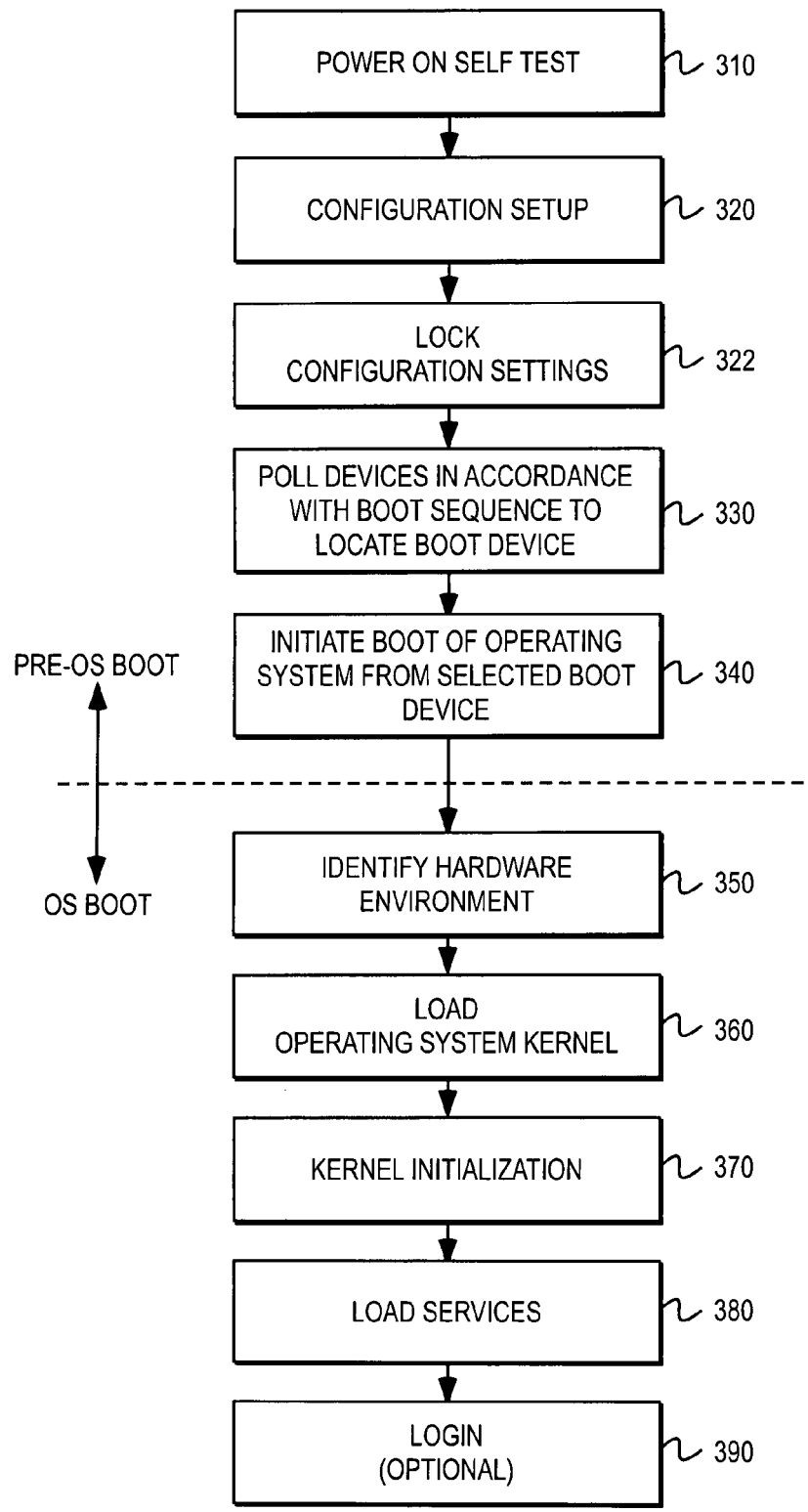
FIG. 3 illustrates one embodiment of a computer system boot process.

FIG. 3 illustrates one embodiment of a computer boot process. Upon initialization, the processor starts executing the BIOS code ("firmware") stored in the boot nonvolatile memory. The BIOS includes instructions for performing a Power On Self Test (POST) as indicated in step 310.

After a successful POST, a window of opportunity for optionally invoking a pre-OS boot BIOS configuration program is available in step 320. Unless the user issues a keyboard key sequence during this window of opportunity to launch the configuration program, the computer will proceed to boot the operating system. The specific key sequence for the configuration program is dependent upon the vendor of the computer's BIOS. Common key sequences include the DEL key, SHIFT-DEL key combination, F-10 key, etc.

At some point prior to booting the operating system, the nonvolatile memory storing the configuration settings is "locked" to prevent unauthorized access as indicated by step 322. Locking may be achieved, for example, by ensuring that the configuration settings are stored in nonvolatile memory locations that the BIOS does not make available to the operating system. The area of nonvolatile memory that the configuration settings are stored in is not exposed or otherwise made available to direct manipulation or access by the operating system. The operating system is expected to use BIOS function calls in order to ensure authorized accesses to the configuration settings.

The BIOS polls peripheral devices in accordance with a peripheral device boot sequence to locate a boot device in step 330. Step 340 initiates an operating system boot from the boot device. The selected boot device is the first peripheral device in the peripheral device boot sequence that has a valid boot sector indicative of the presence of an operating system. The BIOS transfers control to code located within the boot sector of the selected boot device. The boot sector code is operating system- and file system-specific. The BIOS, however, is still used to access the boot device. Steps 310-340 are referred to as a "pre-OS", "BIOS", or "firmware" boot phase.

In step 350, a hardware environment is detected. Information regarding the computer architecture is collected. The operating system kernel is loaded in step 360. In step 370, the kernel is initialized using the information gathered in step 350. Different peripherals, for example, may require distinct drivers to communicate with the operating system. The information gathered in step 350 aids in the determination of the appropriate drivers to be used by the kernel. In step 380, various services utilized by the operating system (e.g., user authorization) may be loaded. The computer then optionally provides a login authorization in step 390 before permitting access by users. Typically, the operating system is considered to have successfully booted once the user is able to successfully perform a login.

Steps 350-390 are referred to as the "OS boot" phase of the boot process. Steps 350-390 are intended to represent a generic operating system boot process. The process may vary depending upon the specifics of the operating system being loaded. For example, some operating systems may be deemed successfully booted prior to a successful user login.

Referring to FIG. 3, the BIOS determines whether to affirmatively conceal the device from the operating system prior to transferring control to the operating system as indicated in step 340. One approach is to provide a key or similar identifier for the device so that it may be designated for firmware-only access. Another approach is to dedicate one or more attachment points for BIOS-only access. Yet another method might combine the other approaches such that only devices that have the key and are coupled to pre-determined access points are reserved for firmware-only access.

The BIOS includes processor-executable instructions and associated data. The term "BIOS-only" or "firmware-only" implies that the processor is executing BIOS instructions rather than instructions forming part of other application programs or the operating system.

This approach permits exclusive use of the physical storage device by the BIOS. Such a device might be used, for example, to store encryption routines, public or private keys, etc. Generally, the peripheral storage device may store either data or processor executable instructions or both. In one embodiment, the peripheral storage device stores processor executable instructions that are executed during POST. One example of such instructions are single-use routines executed during POST.

Figure 4:
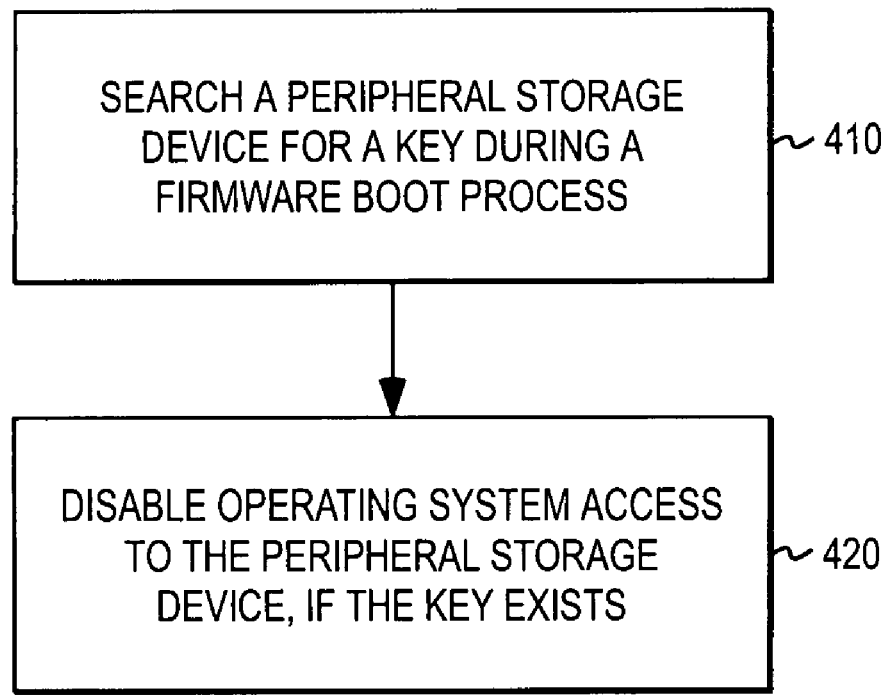
FIG. 4 illustrates one embodiment of a method of disabling operating system access to a peripheral storage device associated with a key.

FIG. 4 illustrates one embodiment of a method of disabling operating system access to a peripheral storage device associated with a key. During the initial firmware boot phase, the processor executes BIOS routines to identify the various devices of the system. Upon detecting a peripheral storage device, the BIOS instructs the processor to search the peripheral storage device for a key at 410. In one embodiment, the key search is performed only on peripheral devices coupled to specific busses of the ICH. For example, the device might be a Universal Serial Bus device coupled to the ICH.

At 420, operating system access to the peripheral storage device is disabled, if the key exists. Referring to FIG. 2, this can be accomplished, for example, by setting one or more bits of a control register 215 in a hub 214 to disable individual ports 254 (attachment point 254 corresponds to a USB port of hub 214). When the operating system boots, the device is not visible to the operating system and cannot be accessed by the operating system.

In one embodiment, the peripheral storage device is a Universal Serial Bus (USB) device such as a flash memory storage device. USB block device architectures rely on a nonvolatile storage technology that is less expensive than system flash memory. BIOS already supports USB. USB protocol handles removable devices such that peripheral storage devices may be removed or re-configured. The USB device is either a "function" or a hub. A peripheral storage device plugged into attachment point 254 is a function. A USB hub may alternatively be plugged into the attachment point to expand the number of USB peripheral devices supported. A USB hub 218 has ports 219 to support attaching additional functions or hubs. (see, e.g., *Universal Serial Bus Specification*, Rev. 2.0, Compaq, et al., Apr. 27, 2000).

Due to the nature of USB devices, the hubs report the attachment or removal of a device. The operating system will not detect a peripheral storage device attached to a port that is disabled. To provide exclusive use of a device by the firmware, the port is maintained as disabled while the operating system is in control and the port is enabled whenever the BIOS is in control.

Once the port is enabled, the hub will notify the BIOS that a device is attached. If the BIOS determines that a "key" exists, the BIOS may utilize the physical storage device as necessary. The BIOS must conceal the keyed device from the operating system, however, prior to returning control to the operating system.

Generally, exclusive access to the peripheral storage device is accomplished by enabling detection or access to the device only 1) prior to initially turning control over to the operating system, or 2) whenever the operating system has been suspended.

Figure 5:
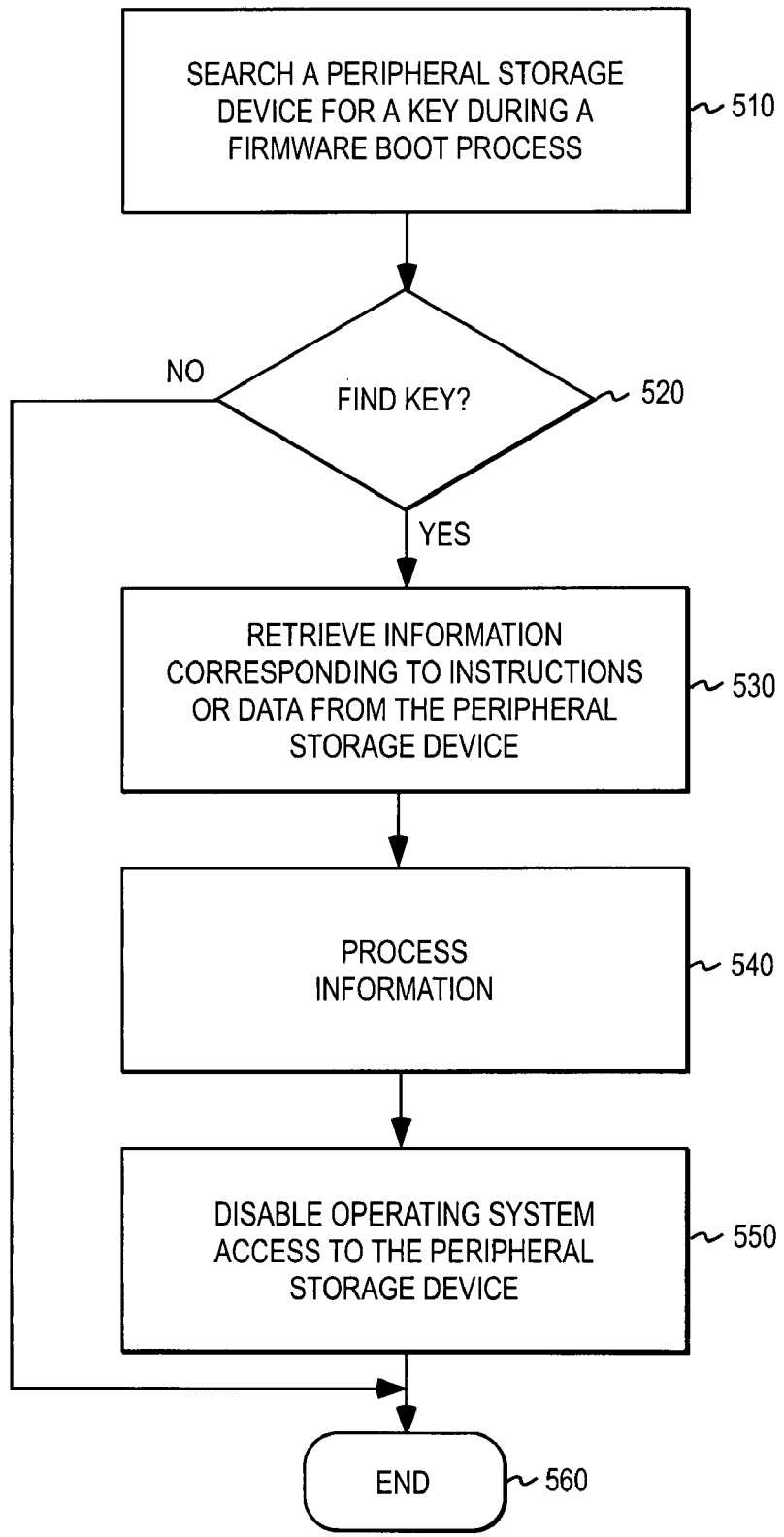
FIG. 5 illustrates one embodiment of a method of providing exclusive access to a peripheral storage device for a firmware boot process.

FIG. 5 illustrates one embodiment of a method of providing exclusive use of a peripheral storage device by the BIOS during a firmware boot process.

During the firmware boot phase, the processor executes BIOS routines to identify the various devices of the system. The peripheral storage device is searched for a key at 510. If the key is found as determined at 520, then the processor retrieves information corresponding to instructions or data from the peripheral storage device at 530. The information is processed at 540. The processor may utilize the data or execute the instructions or both as the case may be. Operating system access to the peripheral storage device is then disabled at 550. This might be accomplished, for example, by setting register bits in a hub to disable individual ports. The method ends at 560. Now when the operating system boots, the device simply is not seen or accessible by the operating system. This method may be utilized, for example for single-use program code to authenticate the computer system during the pre-OS boot phase.

In one embodiment, the key search is performed only on peripheral devices coupled to specific busses of the ICH. For example, the device might be a Universal Serial Bus device coupled to the ICH.

Once the computer system has conducted an OS-boot, there are still opportunities for enabling exclusive access to the BIOS. Some processors provide a "system management mode" (SMM) that is triggered by a system management interrupt (SMI). The SMI is a hardware interrupt generated by the chipset. System management mode is typically used to handle thermal events, power management events, and other events. The operating system is suspended until the event triggering the system management mode has been handled.

In response to an SMI, the processor saves its context (i.e., most processor registers including task registers, control registers, instruction pointers, stack pointers, etc.). The processor then executes the SMI handler instructions. The SMI handler is loaded from the BIOS firmware into a pre-determined area of system memory (SMBIOS) during the POST. The SMI handler includes an instruction to restore the context of the processor prior to returning control to the operating system. The operating system is effectively suspended during execution of the SMI handler as a result of saving the processor context. The operating system resumes upon restoration of the processor context.

Figure 6:
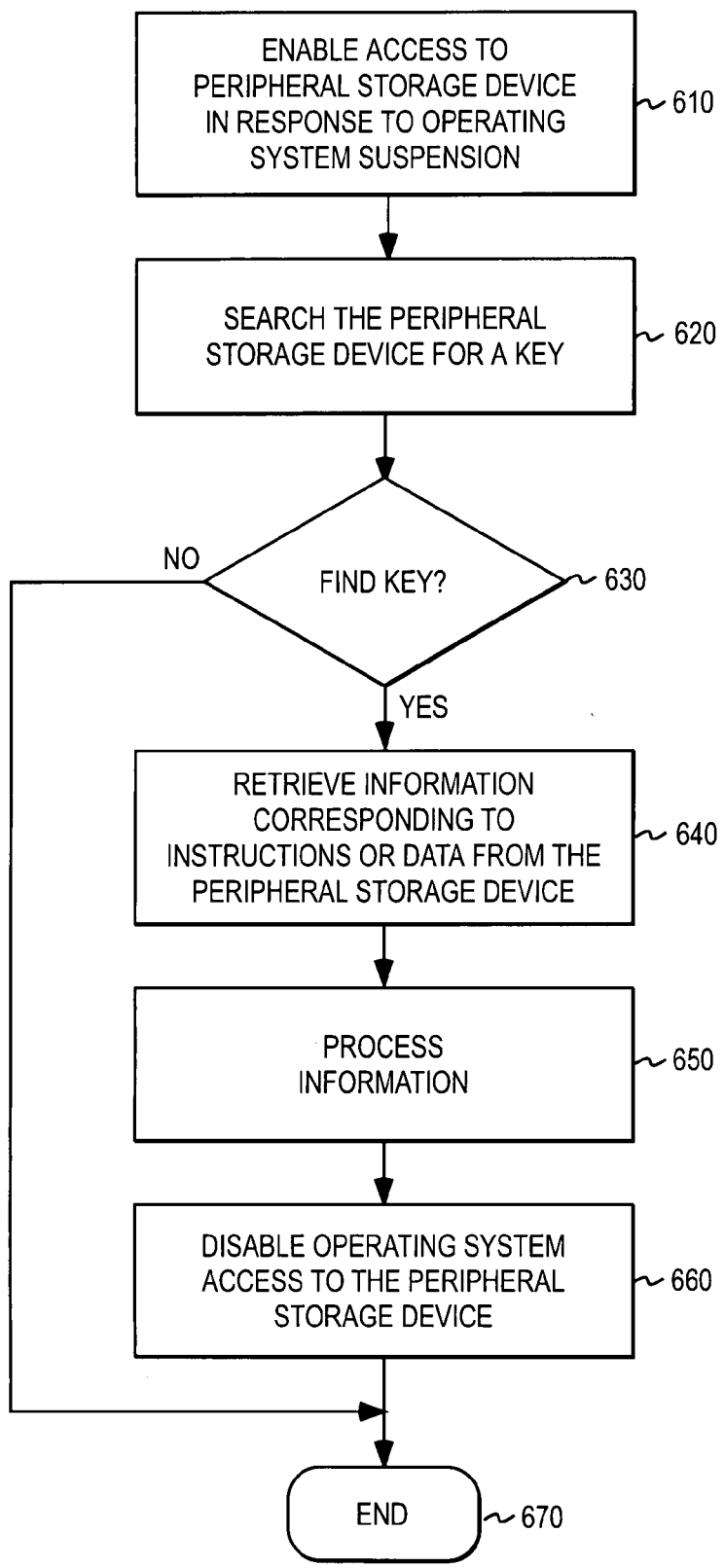
FIG. 6 illustrates one embodiment of a method of enabling access to a peripheral storage device while an operating system is suspended.

FIG. 6 illustrates one embodiment of a method of accessing the peripheral storage device while an operating system is suspended. Such access may occur repeatedly after the OS boot phase.

Access to the peripheral storage device is enabled in response to suspension of the operating system at 610. The peripheral storage device is searched for a key at 620. If the key is found as determined at 630, then the processor retrieves information corresponding to instructions or data from the peripheral storage device at 640. The information is processed at 650. The processor may utilize the data or execute the instructions or both as the case may be. Operating system access to the peripheral storage device is disabled at 660. The method terminates at 670.

The methods illustrated in FIGS. 4-6 rely upon the use of a key to determine whether the peripheral storage device is designated for exclusive BIOS use. In alternative embodiments, the device may be designated for exclusive use by its attachment point or location within the computer system. For example, in lieu of a key, a device coupled to a pre-determined attachment point may be designated for BIOS-only use by virtue of its attachment to the computer system at the pre-determined attachment point.

FIG. 7 illustrates one embodiment of disabling operating system access to a device based upon the location of the device within the computer system. At 710, operating system access to a peripheral storage device associated with a pre-determined attachment point is disabled during a firmware boot process. The device may be connected directly to the attachment point or coupled, for example, via a cable. In one embodiment, operating system access is disabled by setting bits of a control register of a hub associated with the attachment point. Referring to FIG. 2, for example, the attachment point may correspond to a port 254 of a hub 214.

Figure 8:
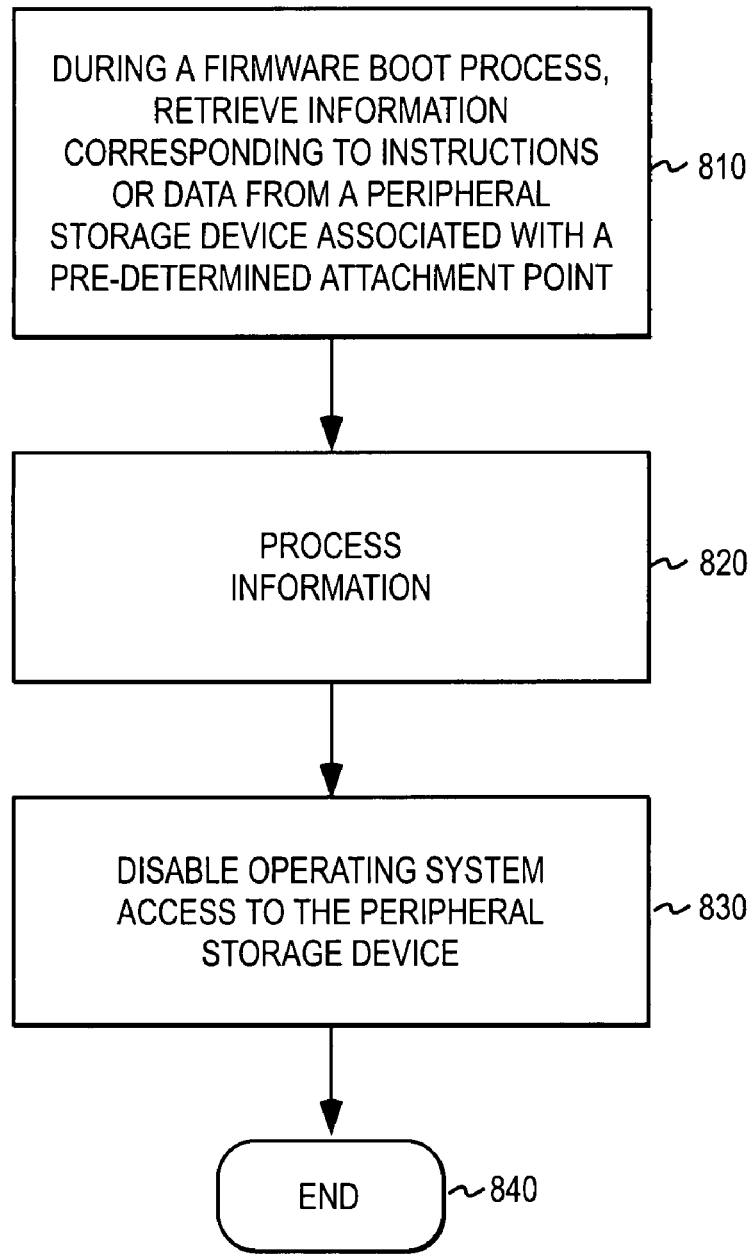
FIG. 8 illustrates one embodiment of a method of providing exclusive use of a peripheral storage device for a firmware boot process.

FIG. 8 illustrates one embodiment of a method of providing exclusive use of a peripheral storage device for a firmware boot process. At 810, information corresponding to instructions or data is retrieved from a peripheral storage device associated with a pre-determined attachment point during a firmware boot process. The information is processed at 820. The processor may utilize the data or execute the instructions or both as the case may be. The data, for example, may include a key to authenticate the computer system. Operating system access to the peripheral storage device is disabled at 830. The method terminates at 840.

Figure 9:
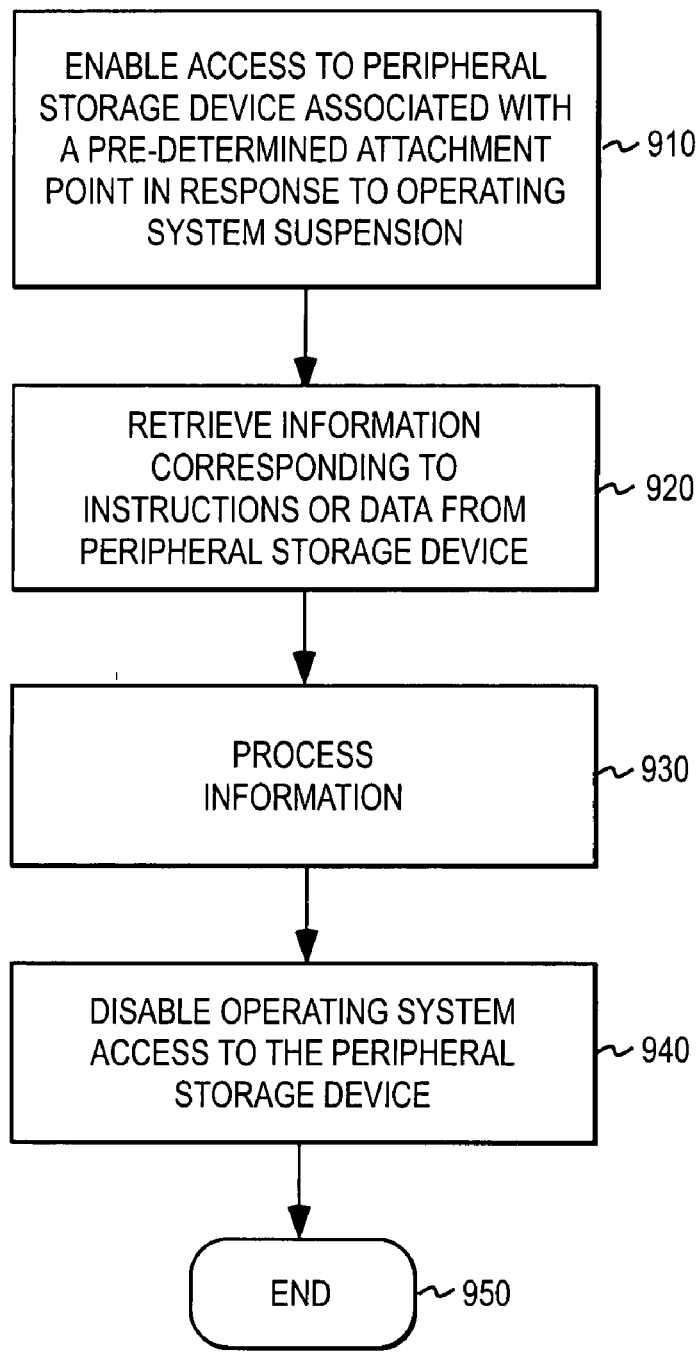
FIG. 9 illustrates one embodiment of a method of accessing the peripheral storage device while an operating system is suspended.

FIG. 9 illustrates one embodiment of a method of accessing the peripheral storage device while an operating system is suspended. Such access may occur repeatedly after the post-OS boot phase. In response to suspension of an operating system, access to a peripheral storage device associated with a pre-determined attachment point is enabled at 910. Information representing data or instructions are retrieved from the peripheral storage device at 920. The information is processed at 930. The processor may utilize the data or execute the instructions or both as the case may be. Operating system access to the peripheral storage device is disabled at 940. The method terminates at 950.

The combination of disabling operating system access to the peripheral storage device while leaving the device enabled whenever the firmware is in control permits the exclusive use of the peripheral storage device by the firmware.

In the preceding detailed description, embodiments of the invention are described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method for providing exclusive use of a peripheral storage device to a Basic Input Output System (BIOS), said method comprising:
   a) searching a peripheral storage device for a key during a firmware boot process, wherein the key identifies the peripheral storage device as a device to be used exclusively by the BIOS; and
   b) providing exclusive use of the peripheral storage device to the BIOS by disabling operating system access to the peripheral storage device, if the key is determined to be contained in the peripheral storage device.

2. The method of claim 1 further comprising:
   c) enabling operating system access to the peripheral storage device, if the key does not exist.

3. The method of claim 1 wherein the peripheral storage device is a nonvolatile memory.

4. The method of claim 1 wherein the peripheral storage device is a Universal Serial Bus device.

5. The method of claim 1 wherein the peripheral storage device is coupled to a hub, wherein b) comprises setting bits of a control register of the hub.

6. A method for providing exclusive use of a peripheral storage device to a Basic Input Output System (BIOS), said method comprising:
   a) enabling access to a peripheral storage device to the BIOS in response to operating system suspension;
   b) searching the peripheral storage device for a key that identifies the peripheral storage device as a device to be used exclusively by the BIOS;
   c) retrieving information corresponding to instructions or data from the peripheral storage device in response to the key being found in the peripheral storage device;
   d) processing the information; and
   e) providing exclusive use of the peripheral storage device to the BIOS by disabling operating system access to the peripheral storage device.

7. The method of claim 6 wherein the peripheral storage device is a Universal Serial Bus peripheral storage device.

8. The method of claim 6 wherein the peripheral storage device is coupled to a hub, wherein a) comprises setting bits of a control register of the hub.

9. The method of claim 6 wherein the peripheral storage device is coupled to a hub, wherein e) comprises setting bits of a control register of the hub.

10. An apparatus comprising:
    a nonvolatile memory storing machine readable instructions to a) search a peripheral storage device for a key during a firmware boot process, wherein the key identifies the peripheral storage device as a device to be used exclusively by a Basic Input Output System (BIOS) and to b) provide exclusive use of the peripheral storage device to the BIOS by disabling operating system access to the peripheral storage device, if the key is determined to be contained in the peripheral storage device; and
    a processor to implement the machine readable instructions.

11. The apparatus of claim 10, wherein the machine readable instructions are further to c) enable operating system access to the peripheral storage device, if the key is determined to not be contained in the peripheral storage device.

12. The apparatus of claim 10, wherein the peripheral storage device is a nonvolatile memory.

13. The apparatus of claim 10, wherein the peripheral storage device is a Universal Serial Bus device.

14. The apparatus of claim 10, wherein the peripheral storage device is coupled to a hub, wherein b) comprises setting bits of a control register of the hub.

15. The apparatus of claim 10, wherein the machine readable instructions further include instructions to enable access to the peripheral storage device to the BIOS in response to operating system suspension.

* * * * *